United States Patent Office 2,959,585
Patented Nov. 8, 1960

2,959,585

METHOD FOR THE PREPARATION OF TESTOSTERONE, DIHYDROTESTOSTERONE AND THEIR ESTERS, AND INTERMEDIATES THEREFOR

Pietro de Ruggieri and Gian Antonio De Ferrari, Milan, Italy, assignors to Ormonoterapia Richter S.p.A., Milan, Italy No Drawing. Filed Apr. 8, 1958, Ser. No. 727,065

12 Claims. (Cl. 260—239.55)

The present invention relates to the preparation of testosterone, dihydrotestosterone and their esters, i.e. of compounds represented by the following formula

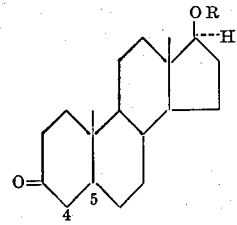

wherein R is either a hydrogen atom or an acyl radical and the bound between carbon atoms 4 and 5 is either a single or a double bond.

As starting materials androst-5-ene-3β,17β-diol-3-acetate (Ruzicka and Wettstein, Helv., 18, 1264, 1935) and androstane-3β,17β-diol-3-acetate (Schering Kahlbaum, Fr. Pat. 788,545, 1935, C.A., 1936, 1519) have been selected. When these compounds are treated with 2,3-dihydropyran in the presence of catalytic amounts of phosphorus oxychloride, there are produced the 3-acetate-17-tetrahydropyranyl ethers of androst-5-ene-3β,17β-diol and androstane-3β,17β-diol, respectively.

These tetrahydropyranyl ethers are completely stable towards alkaline reagents and, thus their production affords a means of protecting hydroxy groups in the course of reactions which are to be carried out in such media.

As a matter of fact, reaction of the above-mentioned tetrahydropyranyl ethers with alkaline substances causes hydrolysis of the 3-acetate group, thus yielding the 17-tetrahydropyranyl ethers of androst-5-ene or androstane-3β,17β-diol, which, upon oxidation either by the Oppenauer method with aluminum isopropoxide and cyclohexanone in toluene solution or by use of the chromium trioxide-pyridine complex, yield the 17-tetrahydropyranyl ethers of testosterone or dihydrotestosterone. Thus, the 17-tetrahydropyranyl ether of androst-5-ene-3β,17β-diol is oxidized by the Oppenauer method with aluminum isopropoxide and cyclohexanone in toluene solution to the 17-tetrahydropyranyl ether of testosterone and the 17-tetrahydropyranyl ether of androstane-3β,17β-diol is oxidized by means of chromium trioxide-pyridine complex to the 17-tetrahydropyranyl ether of dihydrotestosterone.

The latter compounds can be converted into testosterone or dihydrotestosterone by hydrolysis with acids such as hydrochloric, sulfuric or p-toluenesulfonic or, alternatively, reacted with an aliphatic acid of the series containing 2 to 7 carbon atoms in order to produce the corresponding 17-acyl derivatives of testosterone or dihydrotestosterone.

The following examples are given to further illustrate the products and process of the present invention and are not to be construed as limiting.

Example 1.—Androst-5-ene-3β,17β-diol-3-acetate-17-tetrahydropyranyl ether

A solution of 1.0 part of androst-5-ene-3β,17β-diol-3-acetate in 4.0 parts of 2,3-dihydropyran was treated at room temperature for 4 hours with 0.05 part of phosphorus oxychloride. The solution was then diluted with ether, washed with aqueous sodium carbonate followed by water, dried over sodium sulphate and distilled at reduced pressure. The residue after crystallization from methanol, yielded androst-5-ene-3β,17β-diol-3-acetate-17-tetrahydropyranyl ether melting at 142–144° C., [α]_D = 30° (ethanol).

Example 2. — Androstane-3β,17β-diol-3-acetate-17-tetrahydropyranyl ether

Following the procedure described in Example 1, androstane-3β,17β-diol-3-acetate was converted into androstane-3β,17β-diol-3-acetate-17-tetrahydropyranyl ether, M.P. 104–107° C.

Example 3.—Androst-5-ene - 3β,17β - diol-17-tetrahydropyranyl ether 0.430 part of potassium carbonate in 3 parts of water was added to a solution of 1.0 part of androst-5-ene-3β,17β-diol-3-acetate-17-tetrahydropyranyl ether in 30 parts of methanol. By refluxing for one hour, evaporating to a small volume and diluting with water, crystals of androst-5-ene-3β,17β-diol-17-tetrahydropyranyl ether were obtained, M.P. 132–133° C., [α]_D = —63° (ethanol).

Example 4.—Androstane-3β,17β-diol-17-tetrahydropyranyl ether

Following the procedure described in Example 3, androstane-3β,17β-diol-3-acetate-17-tetrahydropyranyl ether was saponified to the corresponding 3β-hydroxy compound, M.P. 131–134° C.

Example 5. — Androst-4-ene-17β-ol-3-one-17-tetrahydropyranyl ether (testosterone - 17 - tetrahydropyranyl ether)

2.5 parts of androst-5-ene-3β,17β-diol-17-tetrahydropyranyl ether were dissolved in 70 parts of toluene and 24 parts of cyclohexanone were added. The solution was heated up to the boiling temperature and 17 parts of solvent were distilled. To the slowly distilling mixture a solution of 1.3 parts of aluminum isopropoxide in 6 parts of dry toluene was added over a period of 20 minutes. After another 20 minutes of slow distillation, a solution of 10 parts of potassium and sodium tartrate in 15 parts of water was added. The mixture was then cooled and the aqueous layer separated. The toluene layer was washed with water and solvent was removed by steam distillation. Extraction with ether of the residual aqueous suspension and concentration of the extracts to a small volume led to crystals of androst-4-ene-17β-ol-3-one-17-tetrahydropyranyl ether, which after recrystallization from hexane showed a M.P. of 106–108° C. and an optical rotation in 95% ethanol of +48°.

*Example 6.—Androstane-17β-ol-3-one-17-tetrahydropyranyl ether (dihydrotestosterone-17-tetrahydropyranyl ether)*

A solution of 0.7 part of androstane-3β,17β-diol-17-tetrahydropyranyl ether in 7 parts of pyridine was added with stirring to a mixture of 0.7 part of chromium trioxide with 7 parts of pyridine, prepared in the usual manner. After storing overnight at room temperature, water was added and the suspension filtered. Crystallization from acetone-water yielded the desired androstane-17β-ol-3-one-17-tetrahydropyranyl ether, M.P. 117–120° C.

*Example 7.—Androst-4-ene-17β-ol-3-one (testosterone)*

A solution of 0.2 part of androst-4-ene-17β-ol-3-one-17-tetrahydropyranyl ether in 3 parts of ethanol, to which 0.01 part of p-toluene-sulfonic acid had been previously added, was refluxed for one hour. Dilution with water gave a crystalline material which by mixed melting point and infrared analysis proved to be the known androst-4-ene-17β-ol-3-one.

*Example 8.—Androstane-17β-ol-3-one (dihydrotestosterone)*

To a solution of 0.3 part of androstane-17β-ol-3-one-17-tetrahydropyranyl ether in 3 parts of acetone, 0.3 part of concentrated hydrochloric acid was added. After refluxing for 30 minutes and diluting with water, crystalline dihydrotestosterone was obtained, the physical constants of which were identical to the constants of an authentic sample.

*Example 9.—Androst-4-ene-17β-ol-3-one-17-propionate (testosterone propionate)*

A solution of 0.2 part of androst-4-ene-17β-ol-3-one-17-tetrahydropyranyl ether in 3 parts of propionic acid was refluxed for 22 hours. Water was added and the mixture extracted with ether. The extracts were washed with aqueous sodium carbonate followed by water, dried over sodium sulphate and distilled to dryness. Several crystallizations of the residue from hexane furnished pure testosterone propionate, with a M.P. of 119–121° C. (undepressed on admixture with an authentic specimen) and an optical rotation in dioxane of +87° C.

Substituting other aliphatic acids in the reaction described above gives the corresponding 17-esters of androst-4-ene-17β-ol-3-one.

*Example 10.—Androstane-17β-ol-3-one-17-acetate (dihydrotestosterone acetate)*

By refluxing for 24 hours a solution of 0.2 part of androstane-17β-ol-3-one-17-tetrahydropyranyl ether in 3 parts of acetic acid and subsequently diluting with water, crystals of dihydrotestosterone acetate were obtained.

Similarly other 17-esters of dihydrotestosterone can be obtained by subjecting androstane-17β-ol-3-one-17-tetrahydropyranyl ether to the reaction described above, using the corresponding acids.

We claim:

1. A method of preparing the 17-tetrahydropyranyl ether of a steroid compound having the formula

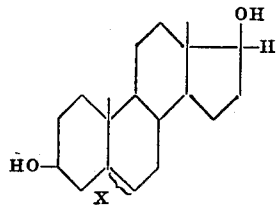

where X is selected from the group consisting of a single and a double bond, which method comprises reacting the corresponding 3-acetate compound with 2,3-dihydropyran in the presence of catalytic amounts of phosphorous oxychloride to produce the 17-tetrahydropyranyl ether of said last-named steroid compound, the 17-tetrahydropyranyl ether group being completely stable toward alkaline reagents; and hydrolyzing said tetrahydropyranyl ether compound under alkaline conditions to produce the corresponding 3-hydroxy compound.

2. A method of preparing the 17-tetrahydropyranyl ether of a steroid compound having the formula

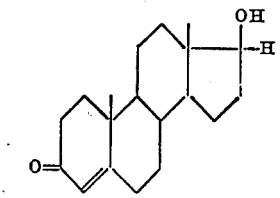

comprising reacting androst-5-ene-3β,17β-diol-3-acetate with 2,3-dihydropyran in the presence of catalytic amounts of phosphorous oxychloride to produce the 17-tetrahydropyranyl ether of said last-named steroid compound, the 17-tetrahydropyranyl ether group being completely stable toward alkaline reagents; hydrolyzing said tetrahydropyranyl ether compound under alkaline conditions to produce the corresponding 3-hydroxy compound; and contacting said 3-hydroxy compound with aluminum isopropoxide-cyclohexanone in toluene solution to convert the 3-hydroxyl group formed by alkaline hydrolysis to a keto group and cause the double bond to shift from the 5:6-position to the 4:5-position.

3. The method of claim 2 in which the 17β-hydroxy group is regenerated by hydrolyzing said 17-tetrahydropyranyl ether group in the presence of an acid selected from the group consisting of hydrochloric, sulfuric and p-toluenesulfonic acids.

4. The method of claim 2 in which said 17-tetrahydropyranyl ether group is converted to a 17-acyloxy group by reacting said tetrahydropyranyl ether with an aliphatic carboxylic acid containing 2 to 7 carbon atoms.

5. The method of preparing the 17-tetrahydropyranyl ether of a steroid compound having the formula:

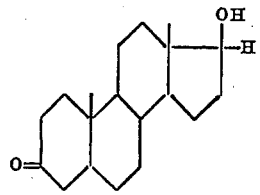

comprising reacting androstane-3β,17β-diol-3-acetate with 2,3-dihydropyran in the presence of catalytic amounts of phosphorous oxychloride to produce the 17-tetrahydropyranyl ether of said last-named steroid compound, the 17-tetrahydropyranyl ether group being completely stable toward alkaline reagents; hydrolyzing said tetrahydropyranyl ether compound under alkaline conditions to produce the corresponding 3-hydroxy compound; and contacting said 3-hydroxy compound with chromium trioxide-pyridine complex in pyridine solution to convert the 3-hydroxyl group formed by alkaline hydrolysis to a keto group.

6. The method of claim 5 in which the 17β-hydroxy group is regenerated by hydrolyzing said 17-tetrahydropyranyl ether group in the presence of an acid selected from the group consisting of hydrochloric, sulfuric and p-toluenesulfonic acids.

7. The method of claim 5 in which said 17-tetrahydropyranyl ether group is converted to a 17-acyloxy group by reacting said tetrahydropyranyl ether with an aliphatic carboxylic acid containing 2 to 7 carbon atoms.

8. The 3-acetate-17-tetrahydropyranyl ether of androst-5-ene-3β,17β-diol.

9. The 3-acetate-17-tetrahydropyranyl ether of androstane-3β,17β-diol.

10. The 17-tetrahydropyranyl ether of androst-5-ene-3β,17β-diol.

11. The 17-tetrahydropyranyl ether of androstane-3β,17β-diol.

12. The 17-tetrahydropyranyl ether of dihydrotestosterone.

References Cited in the file of this patent
UNITED STATES PATENTS

| | | |
|---|---|---|
| 2,637,728 | Ott et al. | May 5, 1953 |
| 2,782,211 | Wettstein | Feb. 19, 1957 |

OTHER REFERENCES

Hirschmann et al.: 76 J.A.C.S., 4021 (1954).